(12) United States Patent
Minarovic

(10) Patent No.: US 7,692,594 B2
(45) Date of Patent: Apr. 6, 2010

(54) POP-UP CABLE ELECTRONIC MARKER

(76) Inventor: Joe T. Minarovic, 201 Logan Ranch Road, Georgetown, TX (US) 78628

( * ) Notice: Subject to any disclaimer, the term of this patent is extended or adjusted under 35 U.S.C. 154(b) by 411 days.

(21) Appl. No.: 11/687,478

(22) Filed: Mar. 16, 2007

(65) Prior Publication Data

US 2008/0223281 A1 Sep. 18, 2008

(51) Int. Cl.
*H01Q 1/04* (2006.01)

(52) U.S. Cl. ............... 343/719; 340/572.1; 340/686.1; 340/686.6; 379/25

(58) Field of Classification Search ............ 340/572.7, 340/572.8, 686.1, 686.2, 686.6, 572.1, 572.5, 340/568.1, 541, 551; 116/200, 209; 52/103; 324/66, 67, 326–329; 342/459; 343/719, 343/867; 379/25; 455/40
See application file for complete search history.

(56) References Cited

U.S. PATENT DOCUMENTS

| | | | |
|---|---|---|---|
| 4,885,571 A * | 12/1989 | Pauley et al. | 340/573.4 |
| 6,271,667 B1 | 8/2001 | Minarovic | |
| 6,778,128 B2 * | 8/2004 | Tucker et al. | 342/22 |
| 6,882,283 B1 * | 4/2005 | Eslambolchi et al. | 340/686.5 |
| 6,962,126 B1 * | 11/2005 | Payson | 116/303 |
| 7,081,820 B2 | 7/2006 | Minarovic | |
| 2005/0200484 A1 * | 9/2005 | Minarovic | 340/572.8 |
| 2006/0011106 A1 * | 1/2006 | Hauck | 108/36 |
| 2006/0208886 A1 * | 9/2006 | Beamer | 340/572.1 |

* cited by examiner

*Primary Examiner*—Daniel Wu
*Assistant Examiner*—Ryan W Sherwin
(74) *Attorney, Agent, or Firm*—Jack V. Musgrove

(57) ABSTRACT

A marker fixture for attachment to a utility conduit such as a telecommunications cable. The fixture has an extension member with an electronic marker at one end, and is secured at the other end to the cable. The extension member is movable between a retracted position wherein the marker is adjacent an access point and an extended position wherein the marker is distant from the access point. The extension member is preferably biased toward the extended position and releasably secured at the marker end proximate the utility structure. The marker fixtures may be pre-installed on a utility infrastructure. The extension member is loosely secured so that the fixture may be moved around the cable after it has been installed in a trench to lie atop the access point. The low profile and conforming shape of the fixture make it particularly advantageous for pre-installation on flexible cables wound on large reels.

21 Claims, 2 Drawing Sheets

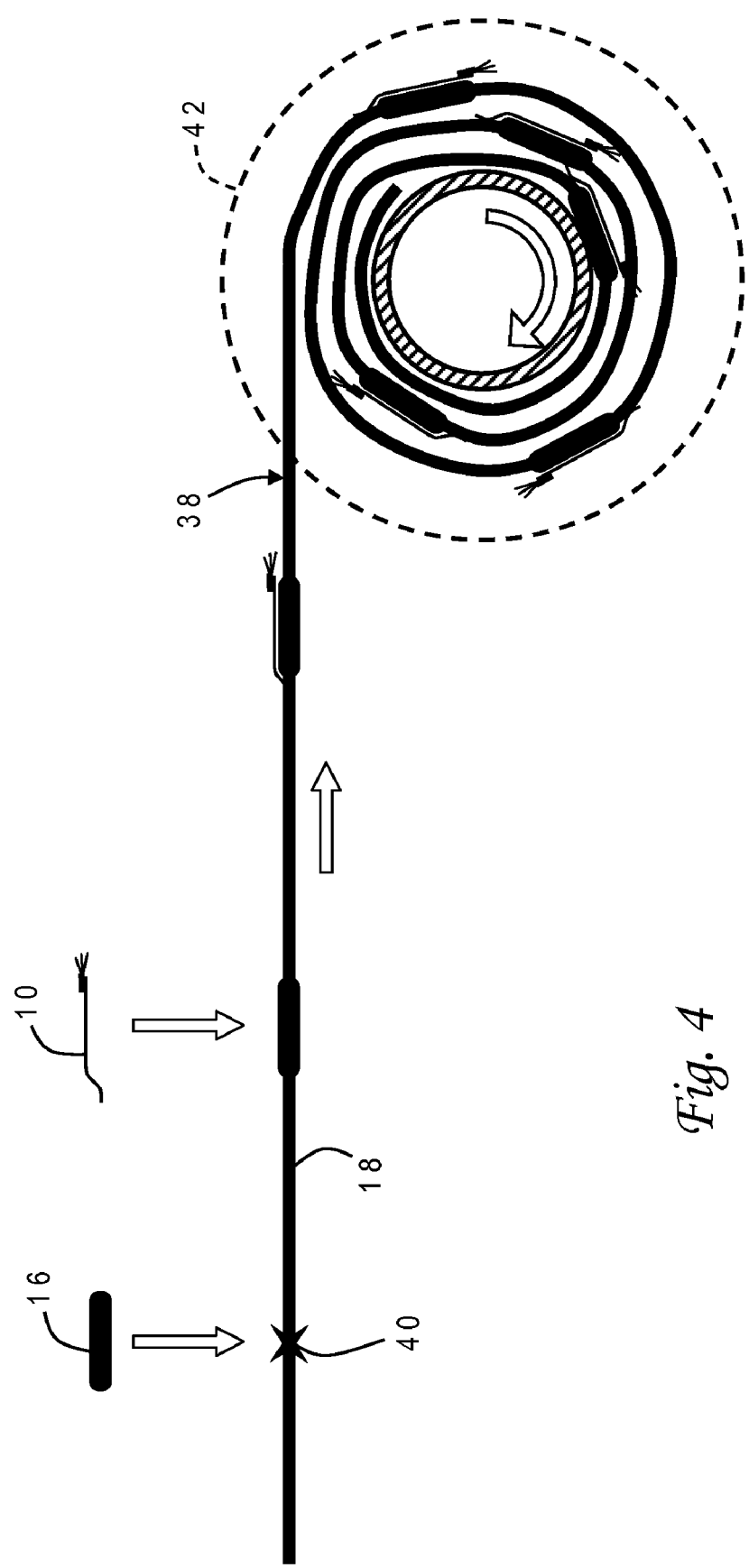

POP-UP CABLE ELECTRONIC MARKER

BACKGROUND OF THE INVENTION

1. Field of the Invention

The present invention generally relates to devices used to mark and locate obscured objects, and more particularly to an electronic marker device which is attached to a cable closure or other buried conduit.

2. Description of the Related Art

Buried conduits are employed for supplying a wide variety of utilities, including pipelines for gas, water and sewage, and cables for telephone, optical fiber, power and television. It often becomes necessary to locate defective or damaged cables, pipes, etc., in order to repair or replace them. Conversely, it is important to know with as much accuracy as possible the approximate vicinity of such items in order to avoid disturbing them when digging or excavating for other purposes. Above-ground marking devices may be installed immediately after the conduit is buried, but they are often lost, stolen, or destroyed after a short period of use. Therefore, it is common to use underground marking devices or systems to enable the later location of a section or feature of an underground utility.

In the past, three different approaches have been used to indicate the presence of buried conduits, namely, warning tapes, trace wires, and electronic marker systems. A warning tape is simply a band of plastic which is placed above the conduit before burial. These tapes are used to alert the excavation team of the presence of the conduit before any damage thereto might occur. As the backhoe or other mechanical digger excavates the site, it will hopefully uproot a portion of the warning tape prior to contact with the conduit. The primary disadvantage of (non-metallic) warning tapes is that they cannot be detected by any surface instrumentation.

A single trace wire is sometimes buried with a utility line. The trace wire is used as a conductor for an AC signal which is applied to the wire at one accessible end, and then acts as an antenna and radiates an electromagnetic field above ground along its entire length. The electromagnetic field may be detected with an appropriate receiver, and the underground path of the line thereby determined. The earliest cable locators used a single sensor which detects a single null or peak (depending upon the orientation of the sensor) as the unit passes near the cable. Many later devices use two or more sensors that combine the signals to provide an indication of conductor proximity. The most common sensors are ferrite-core antennas, i.e., inductors. Although the conduit itself may act as a conductor (i.e., when steel pipe or copper wire cabling is used), most conduits are non-conductive and therefore require a trace wire. There are three significant disadvantages in the use of a trace wire. First of all, it is necessary to provide above ground access to the trace wire in order to couple the AC signal thereto. Secondly, if a break occurs in the wire (due to excavation, or natural causes such as corrosion, earth movement or burrowing animals), then the wire becomes useless. Finally, the trace wire is too thin to imprint a warning message thereon, precluding any visual warning. Additionally, a receiver cannot distinguish the trace wire from any other conductor in the vicinity.

Electronic marker systems for locating buried objects are known in the art, and generally consist of two types, namely, active and passive markers (transponders). Active markers require the use of a power supply which amplifies a signal source (usually an AC signal). The signal is radiated by the underground marker and detected by a receiver unit above ground. Passive markers, in contrast, have no power supply, but rather operate in a resonant mode, responsive to a transmitted electromagnetic field.

A passive marker is basically a wire coil and capacitor surrounded in a protective envelope, which is then buried adjacent to the cable, pipe, or other object to be located. The marker is self-contained, with no external, accessible connections. Passive markers are activated by radiating a signal into the ground in the area where the marker is expected to be found. The signal is emitted via an inductive coil held close to the surface (the transmitter portion of a transceiver). When the coil is directly over, or near, the passive marker (which is itself an inductive coil), the marker accepts energy within its bandpass and stores it, reaching a sustained amplitude during the transmission cycle. When the transmission cycle ends, the marker re-emits the energy at the marker's resonant frequency with an exponentially decaying amplitude. A second coil within the transceiver unit acts as a receiving antenna which detects the re-radiated energy, alerting the locating technician with an audible tone or other indicator means.

There are several kinds of passive transponders for different applications. These include small, near-surface markers for locating objects just inches below the surface, medium size or mid-range markers, full-range markers for locating more deeply buried objects, and self-aligning markers such as the so-called ball marker which supports the marker coil horizontally, regardless of the orientation of the housing. There are hybrid systems wherein, for example, a signal is applied to a buried conductor (cable or trace wire), and coupled through the conductor to one or more markers buried adjacent the conductor. Also, a marker can be used to couple one conductor to another, so that the test signal may be conveyed to the second conductor without a direct physical connection. All of these markers generally float around the underground feature in the soil, and are subject to soil movement.

Electronic markers, as well as warning tapes, are usually color-coded according to the particular type of utility line they mark. Specifically, gas line markers are yellow; telephone cable markers are orange; waste water tunnel markers are green; water pipe markers are blue; and power supply markers are red. Similarly, the passive marker is electronically coded by tuning the coil for a specific resonant frequency. Five distinct frequencies have been designated: 83.0 kHz for gas; 101.4 kHz for telephone; 121.6 kHz for sewage; 145.7 kHz for water; and 169.8 kHz for power. In this manner, a locating technician searching for, say, a gas line, cannot accidentally activate a telephone marker since his transmitter will only be sending out an 83 kHz signal, which is not within the bandwidth for a telephone marker tuned for 101.4 kHz. These frequencies have been designated by convention, and are not meant to be restrictive.

While passive electronic markers have several advantages over warning tapes and tracing wires, they are still subject to certain limitations relating to, for example, the desired resonant frequency of a particular marker. In a passive marker, which is essentially an LC circuit, the resonant frequency f is given by the equation $f=1/(2\pi\sqrt{LC})$ where L is the inductance of the wire coil and C is the capacitance of the capacitor. This frequency must be closely controlled in order to adhere to the foregoing tuning conventions and to provide a return signal of maximum amplitude; however, the actual frequency is affected by component construction, manufacturing tolerances, operating temperature, aging, placement and other factors.

One problem associated with using passive or active transponders for remote identification of buried utility structures is that, if the structure is itself metallic (electrically conductive), then it will influence the detection process by causing a variance in the magnetic lines of flux from metallic sources. It is generally assumed that, to provide accurate locatability, a transponder must be separated from other metallic structures by a minimum of about four inches to avoid magnetic or electromagnetic interference. This effect can in particular be a problem in marking service drops or splices for a telecommunications cable wherein the cabling has conductive elements or sheaths. Current methods for locating service drops are highly dependent on field crews for correct placement of transponders for accurate locating (maintaining a predetermined separation distance from metallic components). Even with correct placement procedures, movement can occur in a filled ditch or hole as a result of loose unpacked soil, freeze/thaw cycling, water erosion, and other causes.

An invention which addresses this problem is described in U.S. Pat. No. 6,271,667. One device disclosed therein combines an electronic marker with a shield or cover that protects a cable closure. The marker is located in a raised portion of the closure guard to reduce interference with metallics in the closure, but there are still problems in using that device. The indicated height of the raised marker is only 3" which may be insufficient to prevent interference. The closure guard is also attached by tie wraps which must be tightly secured or else the device has too much freedom and can move to one side of the cable closure during or after burial.

In general it would be preferable to minimize the involvement of field personnel in deploying markers. Unfortunately, it is difficult to pre-install markers for a number of reasons. Many closures or other utility structures are fabricated in situ, i.e., they are not factory made. There are, however, cables that have multiple, factory-installed closures for drop points or splices used in wiring a subdivision. These preconnectorized cables are wound on large (36" diameter) reels. Markers could be integrated into such factory-made closures but if they were positioned too close to a closure this would result in interference, and if they were positioned distant from the closure the result would be too bulky to be efficiently wound on a reel.

In light of the foregoing, it would be desirable to devise an improved utility marker that could accurately locate a transponder without dependency on craft skill at a proper distance from a buried component of a utility infrastructure, and in particular raised vertically above the infrastructure to facilitate relocation. It would be further advantageous if the utility marker could be pre-attached to a utility cable or conduit without adding significant bulk.

SUMMARY OF THE INVENTION

It is therefore one object of the present invention to provide an improved electronic marker device for locating an obscured object such as a buried utility.

It is another object of the present invention to provide such a marker device which can easily be deployed with minimal involvement of field personnel while still placing the transponder at a proper distance from the buried utility.

It is yet another object of the present invention to provide such a marker device which can be integrated into a preconnectorized cable without adding significant bulk.

The foregoing objects are achieved in a pop-up electronic marker fixture generally comprising an elongate extension member having an electronic marker attached at a free end thereof and secured at the other end to a utility structure, the extension member being movable between a retracted position wherein the electronic marker is adjacent an access point and an extended position wherein the electronic marker is distant from the access point. The extension member is biased toward the extended position and a tie wrap releasably secures the marker end of the extension member proximate the utility structure. In one embodiment the extension member includes a spring section which is in a tension state when the extension member is in the retracted position, and is in a relaxed state when the extension member is in the extended position. The marker fixture is preferably aligned with the utility structure, i.e., a longitudinal axis of the extension member is parallel with a longitudinal axis of the utility structure when the extension member is in the retracted position, and the longitudinal axis of the extension member is inclined away from the longitudinal axis of the utility structure when the extension member is in the extended position. A brace may optionally be used to lock the extension member in the extended position. The utility structure may for example be a telecommunications cable closure surrounding an access point, in which case the electronic marker preferably has a resonant frequency associated with telecommunications.

Marker fixtures of the present invention may be pre-installed on a utility infrastructure as part of a factory process. The access points are formed along a conduit and marker fixtures are attached to the conduit at the access points. For cable splices or drops the access points are surrounded by re-enterable closures. The extension member for a marker fixture is loosely secured so that the fixture may be moved around the cable after it has been installed in a trench, to lie atop the access point and be more vertically erect when deployed. The low profile and conforming shape of the pop-up electronic marker fixture make it particularly advantageous for pre-installation on flexible cables that are wound on large reels.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

FIG. 4 is a pictorial representation of a factory process wherein closures are attached along a cable at predetermined intervals with a pop-up marker fixture of the present invention attached to each closure in the retracted position, and the cable is coiled on a reel.

The use of the same reference symbols in different drawings indicates similar or identical items.

DESCRIPTION OF THE PREFERRED EMBODIMENT(S)

Figure 1:
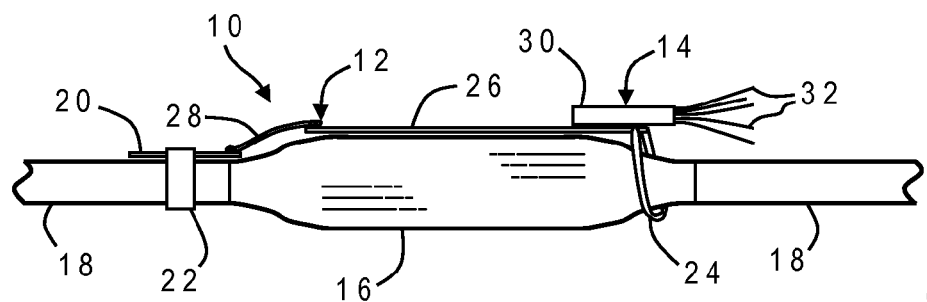
FIG. 1 is a side elevational view of a cable having a closure for a drop or splice with one embodiment of a pop-up marker fixture attached to the cable proximate the closure, with the marker fixture shown in a retracted position.
Figure 2:
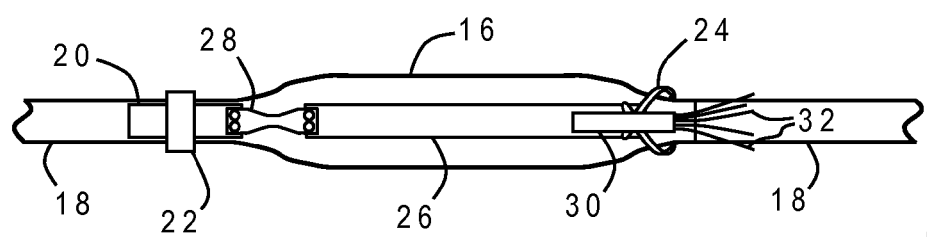
FIG. 2 is a top plan view of the cable, closure and pop-up marker fixture of FIG. 1.

With reference now to the figures, and in particular with reference to FIGS. 1 and 2, there is depicted one embodiment 10 of a pop-up electronic marker fixture constructed in accordance with the present invention. Pop-up electronic marker fixture 10 is generally comprised of an extension member 12 and an electronic marker 14 affixed to one end of extension member 12. Pop-up electronic marker fixture 10 is shown attached to a cable 18 at a re-enterable closure 16. In this exemplary embodiment, cable 18 is a copper wire or fiber optic telecommunications cable (e.g., for telephone service, cable television or broadband internet access) and closure 16 surrounds an access point of the cable such as a splice or drop.

Pop-up electronic marker fixture 10 is shown in FIGS. 1 and 2 in a retracted position in which the longitudinal axis of extension member 12 is generally parallel with the longitudinal axis of cable 18 and snugly fits adjacent closure 16. One end of extension member 12 forms a base portion 20 which is loosely attached to cable 18 by a steel, screw-adjustable strap 22, and the free end at marker 14 is releasably secured to cable 18 by a tie wrap 24 which encircles a portion of cable 18 or closure 16. Extension member 12 is movable between the retracted position and an extended position illustrated in FIG. 3 wherein the marker is distant from the cable. Extension member 12 is preferably biased toward the extended position such that it automatically pops up to the extended position once tie wrap 24 is released.

This biasing may be implemented in several ways. Extension member 12 may be a single, unitary member constructed of a resilient material in an L-shape which is forcibly bent to the retracted position and held by tie wrap 24. The resilient material may include for example polypropylene, polycarbonate, nylon, carbon fiber-reinforced plastic, aromatic polyamide, or an extruded glass fiber compound with epoxy resin. In the illustrated embodiment, extension member is not unitary but rather has three sections: the base portion 20, an elongate portion 26, and a short steel spring section 28 riveted to the other sections. In this embodiment only steel spring section 28 is under angular tension when extension member 12 is in the retracted position, and spring section 28 is relaxed when extension member 12 is in the extended position. Other variations for extension member 12 might include spring-loaded hinges, telescoping sections which may be driven by springs or pneumatically with air-charged cylinders, or non-metallic tubing which is coiled into a small spiral shape for pre-attachment and comes unwound when released. Extension member 12 is depicted overlapping closure 16 but it can alternatively extend off to one side of the closure. Extension member 12 may also be wrapped under tension spirally around cable 18.

Electronic marker 14 may be an active marker or a passive marker. In the preferred embodiment, electronic marker 14 includes an elongate marker body 30 having a visual indicator 32 attached thereto, and in particular may include the features of the marker described in U.S. Pat. No. 7,081,820 which is hereby incorporated. Marker body 30 encloses a peak-detection, ferrite-core transponder assembly forming a resonant LC circuit, with the longitudinal axis of the ferrite core aligned with the axis of marker body 30, i.e., generally parallel to the longitudinal axis of extension member 12. The resonant frequency may be one assigned by convention according to the particular utility being marked, e.g., 101.4 kHz for telephone. Visual indicator 32 may comprise a plurality of brightly-colored whiskers or filaments that generally extend away from marker body 12 along its longitudinal axis. Electronic marker 14 is attached to the free end of extension member 12 by any convenient means, such as adhesives, mechanical fasteners, elastic sleeves, or sonic welding.

Figure 3:
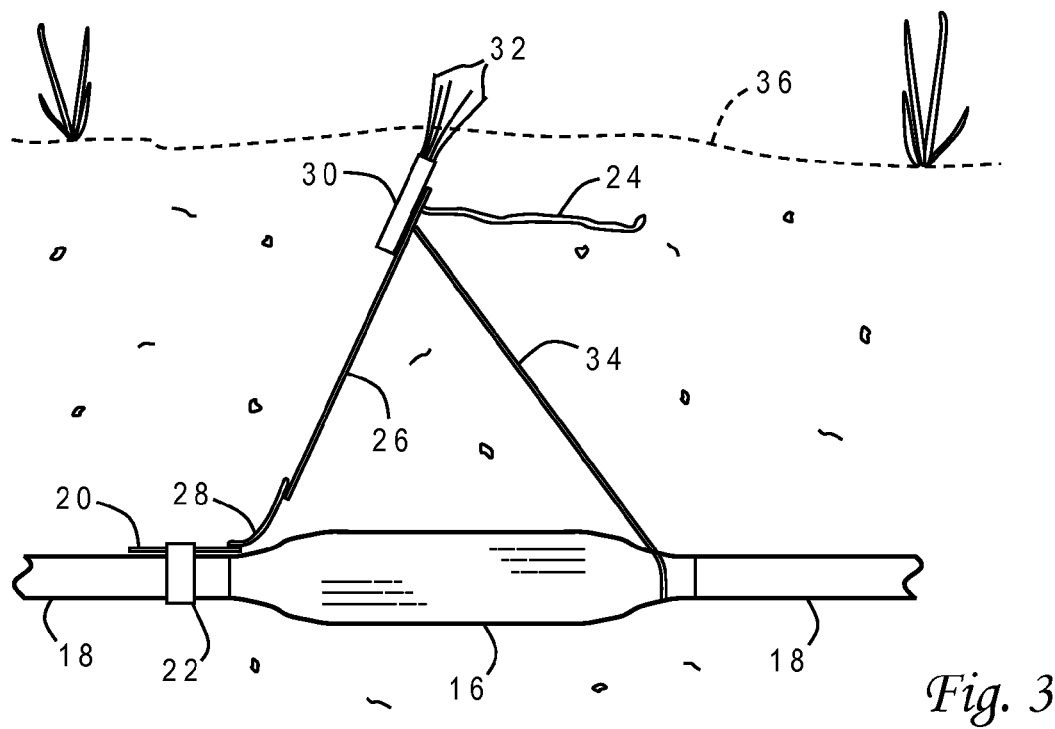
FIG. 3 is a side elevational view of the cable, closure and pop-up marker fixture of FIGS. 1 and 2 as deployed underground after burial, with the marker fixture shown in an extended position.

Referring now to FIG. 3, pop-up electronic marker fixture 10 is shown in a deployed position for a cable installation which has been buried. Strap 22 initially secures base portion 20 of extension member 12 loosely to cable 18 so that the fixture may be moved around and positioned directly atop closure 16, and thereafter strap 22 is tightened to firmly hold base portion 20 in place. In this manner, when tie wrap 24 is subsequently released, extension member 12 springs up to an erect position. This position may be orthogonal to the axis of cable 18 to provide a maximum extension distance, but it is not necessary to have a 90° angle. As long as the extension member is generally inclined away from the axis of the cable then it will provide a vertical reach. Other means may be employed for attaching base portion 20 to cable 18, such as clamps, welds, sockets or other attachment features embedded in the outermost sheath of cable 18.

Means may optionally be provided to lock extension member 12 in the extended position, such as a brace 34 which is secured at one end to cable 18 and attached at the other end to extension member 12 for example by a detent feature or a frictional fitting. Brace 34 provides additional resistance to movement of pop-up electronic marker fixture 10 during and after burial due to shifting soil.

In the extended position, pop-up electronic marker fixture 10 preferably locates marker 14 close to but below the ground level 36, with a portion of the visual indicator 32 extending above ground. As explained further in the above-referenced patent, this placement provides a visual marker to the field personnel who need to relocate the closure, in addition to the relocating function of the ferrite-core marker. This placement is only necessary for those embodiments of the invention which provide the optional visual indication. One end of tie wrap 24 may remain attached to the free end of extension member 12 to provide a further visual cue for the digger. In this implementation tie wrap 24 is a bright, contrasting color such as orange or red. In addition to electronically marking a buried object, pop-up electronic marker fixture 10 acts as a visible anti-dig warning device, even if the fully buried. The bright orange filaments and/or tie wrap alert the digger of the close proximity of the object; extension member 12 may also be brightly painted for this purpose. Once the pop-up electronic marker fixture is recognized, the excavation team can hand-dig to the underground utility structure.

With further reference to FIG. 4, the present invention may advantageously be installed on a preconnectorized cable 38 in a factory setting. Preconnectorized cable 38 has a plurality of closures 16 for splices or drop points 40 formed at predetermined locations along telecommunications cable 18, and is used as a wiring harness for a subdivision. The closures are attached using conventional means; an exemplary closure is the XAGA line of closures marketed by Tyco Electronics Corp. of Fuquay-Varina, N.C. Preconnectorized cable 38 is wound on a 36" diameter reel 42. Pop-up electronic marker fixtures 10 are attached at each closure as the cable is wound onto reel 42. Braces 34 can also be pre-installed at each of the closures.

In this embodiment, the length of pop-up electronic marker fixture 10 is slightly greater than the length of the closure and closely conforms to the periphery of the closure (which is preferable but not necessary). This size and shape, combined with the low profile of pop-up electronic marker fixture 10 allows the fixtures to be added to preconnectorized cable 38 with minimal obstruction/distortion to the coiled cable. During utility construction, the coil is unreeled in a trench, or pulled/bored through underground road crossings, and each fixture 10 is released prior to burial to deploy the electronic markers. While the exact size and shape of pop-up electronic marker fixture 10 may vary considerably depending upon the application, the following dimensions are considered exemplary. Extension member 12 is generally rectangular and sufficiently long to provide a 12" vertical reach based on its particular inclination, is 2" wide and ¼" thick. Marker body 30 is cylindrical with a ½"-¾" outer diameter and 5" long, and the filaments 32 extend 12" from the tip of marker body 30. The resulting fixture can have an overall thickness of one inch or less. This low profile is equally useful in attaching the marker fixture to straight sections of rigid pipe that may be stored in a stacked arrangement, with the fixture secured in the retracted position and lying within the interstices between adjacent stacked pipe sections. Marker fixture 10 may be used to mark specific points along a conduit or generally mark the path of conduit by placement at regular intervals or attachment to conduit sections.

The present invention thus simplifies deployment of an electronic marker by reducing the involvement of field personnel in the placement of the marker. For a given utility infrastructure the pop-up electronic marker fixture can be customized to locate the marker at a predetermined distance from the ground level based on the expected trench depth, and at a minimum distance from any metallics in the infrastructure that might otherwise interfere with the transponder signals. The fixture further places the operational axis of the transponder in a generally vertical orientation for more accurate locatability. The construction of the pop-up electronic marker fixture also solves problems associated with pre-attaching electronic markers to cables, tubing or tapes that are coiled on various sized reels.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been disclosed in the context of marking a telecommunications cable access point it is equally useful in marking other types of utility structures, and the factory pre-installation can be used on other flexible utility conduits, tubing or delivery systems that might be wound on a reel or stacked. It is therefore contemplated that such modifications can be made without departing from the spirit or scope of the present invention as defined in the appended claims.

What is claimed is:

1. A marker fixture comprising:
   an elongate extension member;
   an electronic marker attached to a first end of said extension member; and
   means for securing a second end of said extension member to a utility structure, wherein said extension member is movable between a retracted position and an extended position, said electronic marker being adjacent the utility structure when said extension member is in the retracted position, and said electronic marker being distant from the utility structure when said extension member is in the extended position and said extension member is biased toward the extended position, further comprising a tie wrap releasably securing the first end of said extension member proximate the utility structure.

2. The marker fixture of claim 1 wherein said extension member includes a spring section which is in a tension state when said extension member is in the retracted position, and is in a relaxed state when said extension member is in the extended position.

3. The marker fixture of claim 1 wherein a longitudinal axis of said extension member is parallel with a longitudinal axis of the utility structure when said extension member is in the retracted position, and the longitudinal axis of said extension member is inclined away from the longitudinal axis of the utility structure when said extension member is in the extended position.

4. The marker fixture of claim 1 further comprising a brace which locks said extension member in the extended position.

5. The marker fixture of claim 1 wherein the utility structure is a telecommunications cable access point and said electronic marker has a resonant frequency associated with telecommunications.

6. A method of deploying an electronic marker used in relocation of a buried utility structure, comprising:
   securing a first end of an elongate extension member to the utility structure;
   releasably securing a second end of the extension member adjacent the utility structure in a retracted position, wherein the electronic marker is attached to the second end of the extension member and the extension member is biased toward an extended position in which the electronic marker is distant from the utility structure;
   placing the utility structure with the extension member in the retracted position into a trench;
   after said placing, releasing the second end of the extension member such that the extension member moves to the extended position closer to a ground level of the trench; and burying said utility structure.

7. The method of claim 6 wherein a longitudinal axis of the extension member is parallel with a longitudinal axis of the utility structure when the extension member is in the retracted position, and the longitudinal axis of the extension member is inclined away from the longitudinal axis of the utility structure when the extension member is in the extended position.

8. The method of claim 6 wherein the first end of the extension member is initially loosely secured to the utility structure, and further comprising adjusting a position of the extension member so that it lies atop the utility structure in the trench, and then tightly securing the first end of the extension member.

9. The method of claim 6 wherein the second end of the extension member is releasably secured to the utility structure by a brightly-colored tie wrap attached to the second end of the extension member and the tie wrap remains attached to the second end of the extension member during burial of the utility structure.

10. The method of claim 6, further comprising bracing the extension member in the extended position.

11. The method of claim 6 wherein the utility structure is a telecommunications cable access point and further comprising selecting a resonant frequency for the electronic marker that is associated with telecommunications.

12. A utility infrastructure comprising:
   a utility conduit;
   a plurality of access points along a length of the utility conduit; and
   a plurality of marker fixtures attached to said utility conduit at said access points, the marker fixtures each having an elongate extension member secured at a first end to the utility conduit and an electronic marker affixed to a second end of said extension member, said extension member being movable between a retracted position wherein said electronic marker is adjacent an access point and an extended position wherein said electronic marker is distant from said access point and said extension members are biased toward the extended position and further comprising tie wraps which releasably secure the second ends of the extension members to the utility conduit.

13. The utility infrastructure of claim 12 wherein said marker fixtures have a shape which conforms to a periphery of the access points.

14. The utility infrastructure of claim 12 wherein said utility conduit is flexible and coiled on a reel.

15. The utility infrastructure of claim 12 wherein said marker fixture has a thickness of one inch or less.

16. The utility infrastructure of claim 12 wherein said utility conduit is a telecommunications cable and the access points are surrounded by re-enterable closures.

17. A method of pre-installing a utility infrastructure, comprising:
   forming a plurality of access points along a utility conduit; and
   attaching a plurality of marker fixtures each to the utility conduit at the access points, the marker fixtures having an elongate extension member secured at a first end to the utility conduit and an electronic marker affixed to a second end of the extension member, the extension member being movable between a retracted position wherein the electronic marker is adjacent an access point and an extended position wherein the electronic marker is distant from the access point and the extension members are biased toward the extended position and are releasably secured in the retracted position by tie wraps.

18. The method of claim 17 wherein the extension members are loosely secured so that they may be moved around the utility conduit.

19. The method of claim 17 wherein a longitudinal axis of an extension member is parallel with a longitudinal axis of the utility structure when the extension member is in the retracted position, and the longitudinal axis of the extension member is inclined away from the longitudinal axis of the utility structure when the extension member is in the extended position.

20. The method of claim 17 wherein the utility conduit is flexible, and further comprising coiling the utility conduit with the attached marker fixtures onto a reel.

21. The method of claim 17 wherein the utility conduit is a telecommunications cable and further comprising surrounding the access points by re-enterable closures.

\* \* \* \* \*